W. E. SHERWOOD.
COASTER.
APPLICATION FILED OCT. 28, 1914.
1,212,409.
Patented Jan. 16, 1917.
2 SHEETS—SHEET 1.
Fig-1-
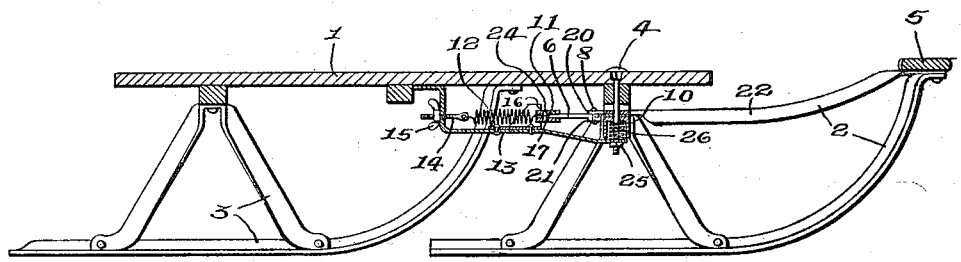
Fig-2-
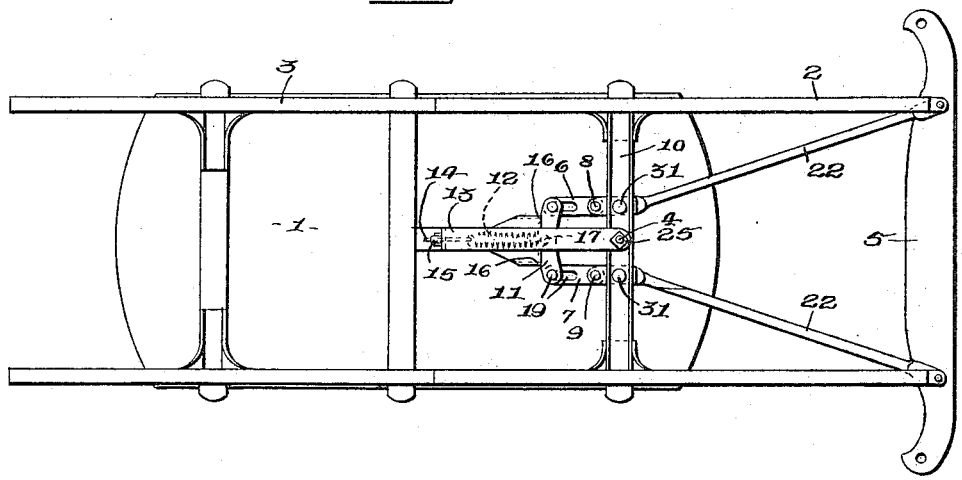
Witnesses:
Chas H. Young.
Jan? Hager
William E. Sherwood,
Inventor
By Parsons & Powell.
Attorneys W. E. SHERWOOD.
COASTER.
APPLICATION FILED OCT. 28, 1914.
1,212,409.
Patented Jan. 16, 1917.
2 SHEETS—SHEET 2.
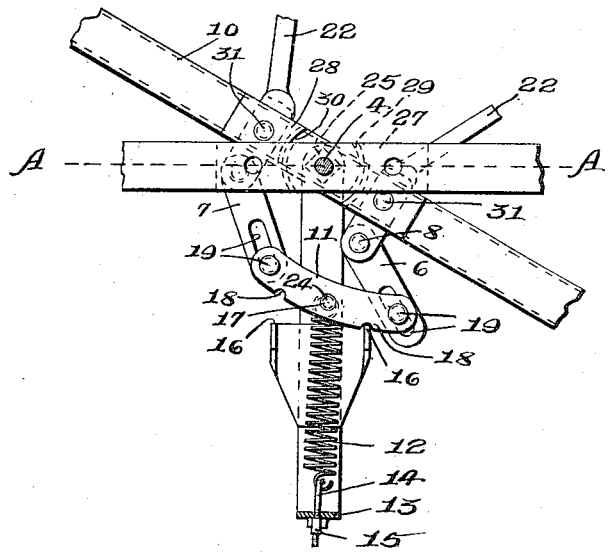
Fig-3-
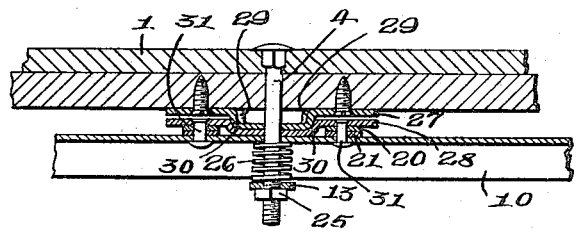
Fig-4-
Witnesses:
William E. Sherwood,
Inventor
By Attorneys

UNITED STATES PATENT OFFICE.

WILLIAM E. SHERWOOD, OF CANASTOTA, NEW YORK.

COASTER.

1,212,409. Specification of Letters Patent. Patented Jan. 16, 1917.

Application filed October 28, 1914. Serial No. 869,041.

*To all whom it may concern:*

Be it known that I, WILLIAM E. SHERWOOD, a citizen of the United States, and a resident of Canastota, in the county of Madison and State of New York, have invented a certain new and useful Coaster, of which the following is a specification.

This invention relates to coasters having front and rear supporting members as sleds or pairs of wheels and in which one sled or pair of wheels is pivoted and can be turned to steer the coaster; and it has for its object a particularly simple and efficient means of the class set forth in my pending application, Sr. No. 838,916, filed May 16, 1914, by which the sled or pair of wheels is held in its central or straight position; and the invention consists in the novel combinations and constructions hereinafter set forth and claimed.

In describing this invention, reference is had to the accompanying drawings, in which like characters designate corresponding parts in all the views.

Figures 1 and 2 are, respectively, a longitudinal section and an inverted plan view of one form of this coaster. Fig. 3 is a fragmentary view illustrating in plan the connections between the spring and the pivoted member and the body of the coaster, the pivoted member being shown as turned to the right. Fig. 4 is a section on the plane of line A—A, Fig. 3.

This coaster comprises generally a body, supporting members for the body, as front and rear sleds or bobs, or pairs of wheels, one of these supporting members, usually the front member turnable laterally in opposite directions being here shown as pivoted to the body by a king bolt, and spring operated means connected to the turnable supporting member on opposite sides of its axis. The invention is here shown as embodied in a bob-sled. Preferably, the front sled or bob is turnable or pivoted, although in some instances it might be desirable to pivot the rear sled or bob.

1 is the body in the form of a top board, and 2, 3 are front and rear bobs or sleds, the front sled being pivoted by a king bolt 4 to the body and the rear sled 3 being fixed. The sled has a suitable foot piece 5 by means of which it can be turned to the right or left.

The spring operated means here illustrated comprises motion transmitting parts connected to the sled 1 on opposite sides of its pivot 4, a cross piece or lever connected to the parts, and spring means connected to the cross piece or lever. The lever is arranged to move about axes located between the points the motion transmitting parts are connected thereto and the center of the lever, and as here shown fixed fulcrums are provided for the lever, which fulcrums are located on opposite sides of the point the spring is connected to the lever. As here shown, the spring operated means is extended lengthwise of the body of the coaster and is located centrally thereof in the rear of the pivot of the front sled, but obviously it may be arranged in other suitable relation to the pivoted sled.

The parts pivotally connected to the sled on opposite sides of its pivot 4 are here shown as links 6, 7 connected to the sled to partake of the pivotal movement thereof and here shown as pivoted at their front ends at 8, 9 to rearwardly extending arms provided on the cross bar 10 of the front sled 2, the links being connected at their rear ends by lost-motion connections to the arms of the cross piece or lever 11, to the central part of which the spring 12 is connected. Said spring 12 is connected at its rear end to a bracket 13 by means of a bolt 14 on which a wing nut 15 turns for adjusting the tension of the spring. The links and arms are normally arranged in a straight line toggle fashion. The bracket 13 is fixed to the body 1.

16 are the fulcrums for the cross piece or lever 11, these fulcrums being carried by the bracket 13 and located on opposite sides of the point 17 where the spring 12 is connected to the lever 11. As here shown, the lever 11 is provided with cutouts 18 for receiving the fulcrums 16 and is connected to the links 6, 7 by pin-and-slot connections 19.

The rearwardly extending arms to which the links 6, 7 are pivoted, as at 8, 9, are composed of upper and lower parts or sections 20, 21, the upper sections 20 being extensions of the rear ends of struts 22 extending from the front ends of the runners of the front sled and converging rearwardly, said sections 20 overlying the cross bar 10 of the sled. Each section 21 has its body portion interposed between the companion section 20 and the upper face of the cross bar 10 and has its rear end offset from the rear end of the companion section 20, the links 6, 7 have their front ends inserted between the rear ends of said sections 20 and 21. The lever 11 is also composed of upper and lower sections and the rear ends of the links 6, 7 extend between said sections, and the spring 12 is connected at its front end to a pin 24 connecting the sections of the lever 11. The brace 13 has its front end extended under the cross bar 10, and the king bolt 4 extends through the fifth wheel plates, to be described, through the cross bar 10 and through the front end of the bracket 13, and has a nut 25 at its lower end which turns against the lower side of the brace 15. A spring 26 is located between the upper face of the braces and the cross bar. The cross bar is here shown as a channel iron and the spring 26 is located in the channel.

27, 28 are the fifth wheel plates previously referred to, these plates having central depressions or bosses formed with arc shape sides 29, 30, the depressions being nested one within the other, and the king bolt extending axially through the same. The sections 20, 21 extend under the offset ends of the fifth wheel plate 28, and are secured to the cross bar 10 by rivets or other fastening means 31 passing through the plate 28 and said sections 20, 21.

In operation, when the front sled is turned to the right, as shown in Fig. 3, the left end of the lever 11 moves away from its fulcrum point 16, and the lever fulcrums on its opposite fulcrum and hence the spring is tensioned and the link 11 assumes a position like that shown in Fig. 3. The reverse of this operation takes place when the sled is turned to the left. The spring exerts its tension on the lever in either direction it is turned and the sled always turns about the same center located in the central line of the coaster. The spring serves to hold the front sled straight so that if desired the sled can be used either as bobs or as an ordinary rigid sled.

This sled is of the same type as that set forth in my earlier filed application referred to, in which the invention in its broader aspect is claimed.

What I claim is:—

1. A coaster comprising a body, front and rear supporting members for the body, one being pivoted to the body, motion transmitting parts pivoted to the pivoted member on opposite sides of its pivot and partaking of the pivotal movement thereof, a lever connected to said parts and movable about axes located between the points said parts are connected to the lever, and spring means connected to the lever, substantially as and for the purpose set forth.

2. A coaster comprising a body, front and rear supporting members, one member being pivoted to the body, links connected to said member on opposite sides of its pivot, a cross piece connected to the links, and spring means connected to the cross piece, the cross piece being movable about axes located between the points of connection of the links to the cross piece and the center of the cross piece, substantially as and for the purpose described.

3. A coaster comprising a body, front and rear supporting members, one member being pivoted to the body, a lever, spring means connected to the lever between the ends thereof, connections between the arms of the lever and the pivoted member on opposite sides of the pivot thereof, and fulcrums for said lever located on opposite sides of the point the spring means is connected to the lever, substantially as and for the purpose set forth.

4. A coaster comprising a body, front and rear supporting members for the body, one member being pivoted, means connected to the pivoted member and to the body tending to hold the pivoted member in its central position and to resist pivotal movement thereof in either direction, said means comprising a lever pivotally connected to the pivoted member on opposite sides of the pivot thereof, spring means connected to the lever between the ends thereof, and fixed fulcrums for the lever located on opposite sides of the point the spring means is connected to said lever, substantially as and for the purpose described.

5. A coaster comprising a body, front and rear supporting members for the body, one member being pivoted to the body, a lever, spring means connected to the lever between the ends thereof, fixed fulcrums for the lever on opposite sides of the point the spring is connected to, and links connecting the arms of the lever to the pivoted member on opposite sides of the pivot thereof, substantially as and for the purpose specified.

6. A coaster comprising a body, front and rear supporting members for the body, the front member being pivoted to the body, a lever, spring means connected to the lever between the ends thereof, fixed fulcrums for the lever on opposite sides of the point the spring is connected to the lever, and links connecting the arms of the lever to the pivoted member on opposite sides of the pivot thereof, the links being connected to one of the parts they connect by lost motion connections, substantially as and for the purpose set forth.

7. A coaster comprising a body, front and rear supporting members for the body, the front member being pivoted to the body, a lever, spring means connected to the lever between the ends thereof, fixed fulcrums for the lever on opposite sides of the point the spring is connected to the lever, and links connecting the arms of the lever to the pivoted member on opposite sides of the pivot thereof, the links being connected to the opposite arms of the lever by pin-and-slot connections, substantially as and for the purpose described.

8. A coaster comprising a body, front and rear supporting members for the body, one member being pivoted to the body and provided with parallel arms rigid therewith on opposite sides of the pivot, links pivoted to the ends of said arms, and normally arranged in a straight line therewith, a cross piece connecting the links, a spring connected to the cross piece between the ends thereof, and fulcrums for engaging the cross piece on opposite sides of the point the spring is connected to the cross piece, substantially as and for the purpose set forth.

9. A coaster comprising a body, front and rear supporting members for the body, one member being pivoted to the body and having struts, connected to the pivoted member on opposite sides of the pivot thereof, and spring means connected to the struts and tending to hold the pivoted member in its central position and to resist pivotal movement thereof in either direction, substantially as and for the purpose described.

10. A coaster comprising a body, front and rear supporting members for the body, one member being pivoted to the body and having struts, one connected to the pivoted member on opposite sides of the pivot thereof, the struts having extensions extending beyond a transverse line extending through the pivot of said member when said member is in its central position, and spring means connected to said extensions and tending to hold the pivoted member in its central position and to resist pivotal movement therein in either direction, substantially as and for the purpose specified.

11. A coaster comprising a body, front and rear supporting members for the body, one member being pivoted to the body and having strut rods connected to the pivoted member on opposite sides of its pivot and members opposed to the inner ends of the strut rods, links extending between, and pivoted to, the inner ends of the strut rods and said parts, spring means connected to the links, and power transmitting connections between the spring means and the links and tending to return the pivoted member to its central position, substantially as and for the purpose set forth.

12. A coaster comprising a body, front and rear supporting members for the body, one member being pivoted to the body and having strut rods connected to the pivoted member on opposite sides of its pivot and parts opposed to the rods, links pivoted between the rods and said parts, a cross piece connected to the links and including upper and lower sections which receive between them the ends of the links, a spring connected to the cross piece between the ends thereof and also between the sections thereof, and fixed fulcrums for the cross piece located on opposite sides of the point the spring is connected thereto, substantially as and for the purpose described.

13. A coaster comprising a body, front and rear supporting members, the front member being pivoted to the body, the body being provided with a cross bar and the pivoted member being provided with a cross bar opposed to the former cross bar, fifth wheel plates mounted on opposing faces of the cross bars and formed with depressions having arc shape sides, the depression of one plate being nested in that of the other, and spring means connected to the pivoted member and to the body of the coaster tending to hold the pivoted member in its central position, the spring means including links extending between the ends of the plate on the cross bar of the pivoted member and the upper face of said cross bar, substantially as and for the purpose specified.

14. A coaster comprising a body, front and rear supporting members, one member being pivoted to the body, a lever, spring means connected to the lever, connections between the arms of the lever and the pivoted member on opposite sides of the pivot thereof, and fulcrums for the lever located on opposite sides of its center, substantially as and for the purpose set forth.

15. A coaster comprising a body, front and rear supporting members, one member being pivoted to the body, a lever, spring means connected to the lever, connections between the arms of the lever and the pivoted member on opposite sides of the pivot thereof, and fulcrums for the lever located on opposite sides of its center, said connections including lost-motion devices, substantially as and for the purpose described.

16. A coaster comprising a body, front and rear supporting members, one member being pivoted to the body, a lever, fulcrums carried by the body for the lever located on opposite sides of the center of the lever, spring means connected to the lever to resist pivotal movement thereof in either direction of movement of the lever, and links between the ends of the lever and the pivoted member, substantially as and for the purpose specified.

17. A coaster comprising a body, front and rear supporting members, one member being pivoted to the body, a lever, fulcrums for the lever carried by the body located on opposite sides of the center of the lever, spring means connected to the lever to resist pivotal movement thereof in either direction of movement of the lever, and links between the ends of the lever and the pivoted member, the links including lost motion connections, substantially as and for the purpose set forth.

18. A coaster comprising a body, front and rear supporting members, one member being movable about a vertical axis relatively to the body, a lever movable with said member, the lever being connected to said member, a spring connected to the lever, and fixed fulcrum points spaced for engaging the lever at points spaced apart so that the spring is tensioned when the member is moved in either direction, substantially as and for the purpose described.

19. A coaster comprising a body, front and rear supporting members, one member being movable about a vertical axis relatively to the body, a lever movable with said member, the lever being connected to said member, a spring connected to the lever, and fixed fulcrum points spaced for engaging the lever at points spaced apart so that the spring is tensioned when the member is moved in either direction between the fulcrum points, substantially as and for the purpose specified.

In testimony whereof, I have hereunto signed my name in the presence of two attesting witnesses, at Syracuse, in the county of Onondaga, and State of New York, this 14th day of September, 1914.

WILLIAM E. SHERWOOD.

Witnesses:
S. DAVIS,
J. H. GLAZIER.

Copies of this patent may be obtained for five cents each, by addressing the "Commissioner of Patents, Washington, D. C."